July 31, 1945. W. C. HESS 2,380,597
VALVE
Filed Dec. 31, 1941  2 Sheets-Sheet 1
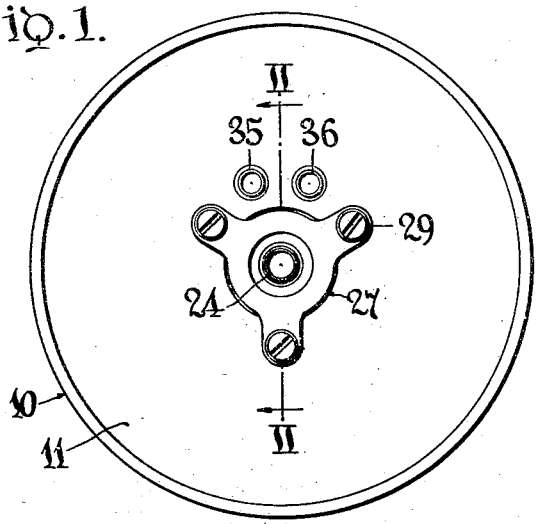
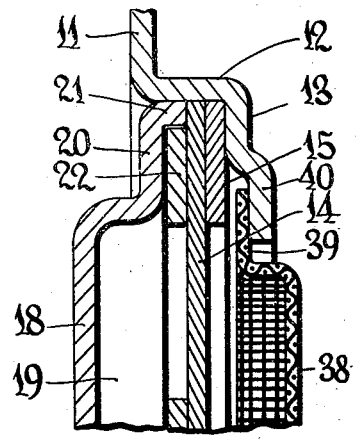
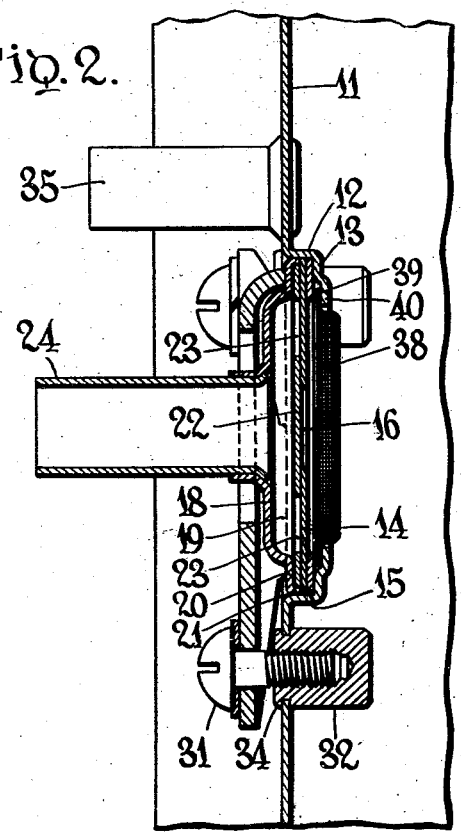
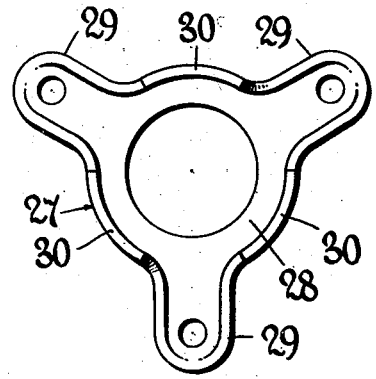
INVENTOR
WILLIS C. HESS
BY
Bean, Brooks, Buckley & Bean.
ATTORNEYS July 31, 1945.  W. C. HESS  2,380,597
VALVE
Filed Dec. 31, 1941   2 Sheets-Sheet 2
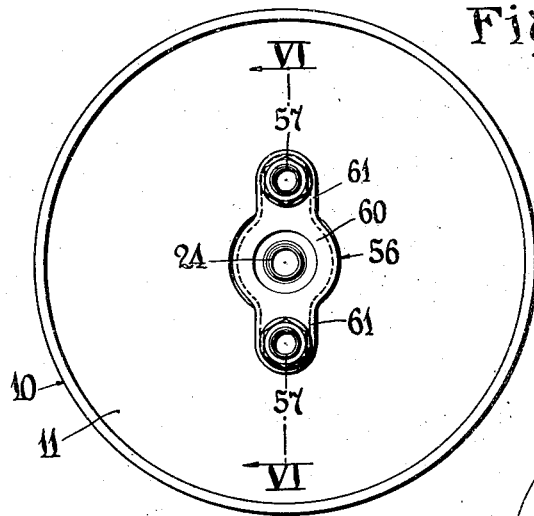
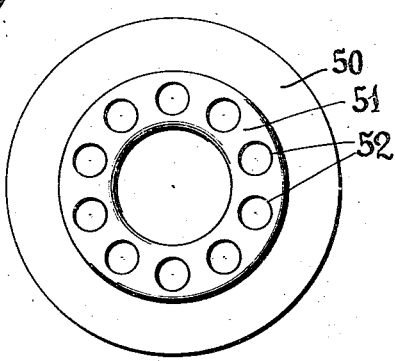
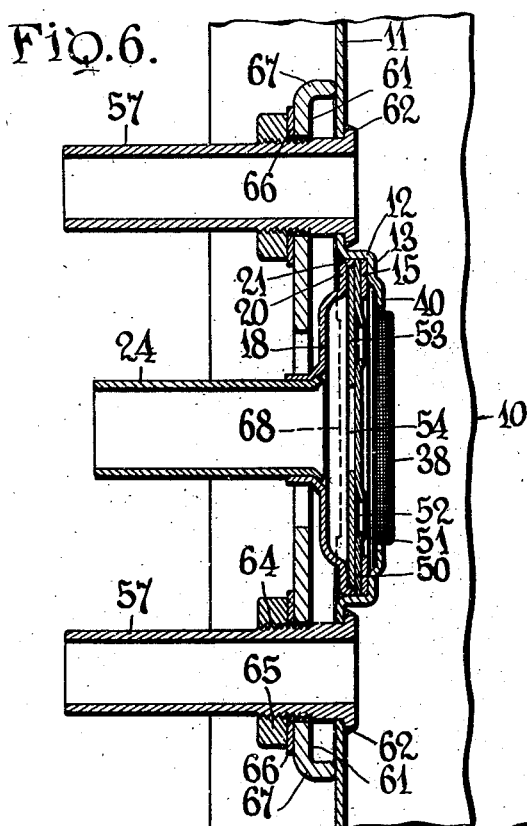
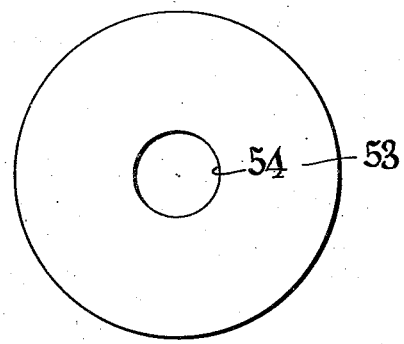
INVENTOR
WILLIS C. HESS
BY
Bean, Brooks, Buckley & Bean
ATTORNEYS Patented July 31, 1945

2,380,597

UNITED STATES PATENT OFFICE 2,380,597

VALVE

Willis C. Hess, Buffalo, N. Y., assignor to Trico Products Corporation, Buffalo, N. Y.

Application December 31, 1941, Serial No. 425,101

3 Claims. (Cl. 251—127)

This invention relates to valves and has particular reference to uni-directional valves commonly called check valves.

The present invention provides a check valve structure wherein extreme sensitivity is accompanied by accurate and substantially complete closure of the valve against fluid passage in one direction past the valve. An object of the present invention is the provision of check valve means which permits the retention of fluid pressure differentials in reservoirs and the like over long periods of time without substantial dissipation by reason of fluid leakage past the check valve means. A further object of the invention is to provide a valve construction which meets this requirement and is still extremely sensitive to changes in the direction of the fluid pressure differential at opposite sides of the valve.

In a preferred form of the valve of the present invention this sensitivity is attained by arranging the valve in such manner as to be held seated by fluid pressure alone when the differential at opposite sides of the valve is of such direction as to dictate a closed position of the valve.

A prime advantage of valves constructed in accordance with the teachings of the present invention resides in the facility and economy with which valves of required seal and sensitivity may be constructed.

Other objects and advantages of the valve of the present invention will appear to those skilled in the art from a perusal of the ensuing specification, taken together with the accompanying drawings. While specific embodiments of the principles of the present invention are set forth herein by way of example it is to be understood that the spirit and scope of the invention is not to be considered limited otherwise than as defined in the appended claims.

In the drawings:

Fig. 1 is an elevational view of the end of a cylindrical tank or reservoir provided with one form of the new valve of my invention;

Fig. 2 is a fragmentary cross-sectional view taken on the line II—II of Fig. 1 but on an enlarged scale;

Fig. 3 is a further fragmentary cross-sectional view seen as in Fig. 2 but on a still further enlarged scale;

Fig. 4 is a detail view looking at the inside of a clamp element of the instant form of my invention;

Fig. 5 is a view similar to Fig. 1 but depicting a modified form of the valve of the present invention;

Fig. 6 is a fragmentary cross-sectional view taken on the line VI—VI of Fig. 5 but on an enlarged scale; and Figs. 7 and 8 are detailed elevational views of the valve seat element and the valve element, respectively, of the device of Figs. 5 and 6.

Throughout the several figures of the drawings like characters of reference denote like parts and the numeral 10 designates generally a casing or fluid pressure reservoir which is shown to be of cylindrical form. One form of the valve of my invention is shown, by way of example merely, associated with an end wall 11 of such casing. In the form of valve illustrated in Figs. 1 through 4 there is a valve receiving well which in the illustrated instance is provided by forming an annular flange 12 terminating in an inwardly directed flat flange portion 13 disposed in a plane substantially parallel to that of the wall 11 but offset therefrom and providing a ledge for supporting a valve seat disc 14, there being an intermediate backing ring 15.

In the form being described the valve seat disc 14 has a single central, preferably circular, fluid port 16.

A cover element designated 18 cooperates with the annular flanges 12 and 13 of the wall 11 to form a valve chamber 19. The cover element 18 comprises generally a disc having an offset marginal portion 20 and a peripheral flange 21 which fits within the annular flange 12 of the wall 11 and seats against the valve seat disc 14. The space so provided between the valve seat disc 14 and the marginal portion 20 of the cover element 18 is just slightly larger than the thickness of a valve disc 22 which is received therein.

The valve disc 22 may vary somewhat in the material of its manufacture but excellent results are achieved in the use of a light weight valve disc of fabric impregnated with resin or the like. A qualification is that the surface of the disc so formed be smooth and a material known commercially as "Fabrikoid" meets the stated requirements. The valve 22, in the embodiment of Figs. 1 through 4, is provided with a plurality of circularly arranged openings 23, the radius of the pitch circle of the openings being such that the openings lie radially outwardly of the central fluid port 16 of the valve seat 14.

A nipple 24 is arranged for fluid communication with the valve chamber 19 as by being secured in the cover element 18, in the illustrated instance centrally thereof. The valve seat disc 14, the backing ring 15, and the cover element 18 are all held in relatively fixed assembled position in the well formed in the wall 11 by means of a clamping element designated generally 27 and illustrated in detail in Fig. 4. The clamping element 27 has an annular central portion 28 and a plurality of equally spaced radiating arms 29 projecting therefrom. Intermediately of each pair of adjacent arms 29 the annular central portion is provided with a lateral flange portion 30 which is arranged to extend into abutment against the offset marginal portion 20 of the cover element 18 and thereby space the central portion 28 and the arms 29 from the wall 11, as appears from a consideration of Fig. 2. Each of the arms 29 is perforated to receive a screw 31 which is threaded into a plug 32 carried by the wall 11 of the casing 10. The several plugs 32 may be secured in the casing wall by inserting reduced end portions thereof through openings in the casing wall and peening or riveting the reduced end portions as at 34 in Fig. 2.

Other fluid communications with the interior of the casing or reservoir may be established in any desired manner as by means of nipples 35 and 36, see Figs. 1 and 2.

A screen for preventing the passage of dust or other foreign matter into the valve mechanism may be provided and in the illustrated instance such screen is in the form of a selectively shallow cup 38 having a marginal flange 39 which may be supported in assembled position with respect to the valving device proper by providing an offset 40 in association with the flange portion 13 of the wall 11 as appears clearly from a consideration of Figs. 2 and 3.

It will be noted that the screen 38 is loosely mounted and the play provided in its mounting, besides providing ample manufacturing tolerance, results in vibration of the screen in use on vehicles and the like, which vibration provides for shaking off of foreign matter which may tend to accumulate on the screen.

From the foregoing it will appear that when the degree of fluid pressure in the nipple 24 and the valve chamber 19 falls below that prevailing in the reservoir 10 the valve 22 will be moved to a position of abutment with the offset portion 20 of the cover element 18 and fluid will flow from the reservoir 10 through the opening 16 in the valve seat and the openings 23 in the valve into the valve chamber 19 and the nipple 24. When the fluid pressure in the valve housing predominates, on the other hand, the valve 22 will be held in closed position against the valve seat 14 by such fluid pressure.

In the modification of Figs. 5 through 8 several innovations are effected. Parts of this modification which are identical with corresponding parts in the first described modification are designated by like characters of reference and such parts include the tank 10 with its end wall 11 provided with annular flange portions 12, 13 and 40, backing ring 15, the cover element 18 with its offset marginal portion 20, peripheral flange 21, and central nipple 24.

In the modification presently being described a novel valve seat disc 50 is provided with an intermediate annular depression or embossment 51 and a circular row of valve ports 52 formed in such embossed portions. A valve disc 53 having a central fluid passage 54 is arranged to seat against the valve seat disc 50 in a manner like that of the valve in the first described embodiment.

In the instant modification the clamping element, designated generally 56, cooperates in a novel manner with a pair of fluid conduit nipples 57 whereby these elements cooperate mutually in retaining themselves in properly functioning assembled position. As appears clearly from a consideration of Fig. 6 the clamping element comprises a central discoidal body portion 60 having a pair of oppositely extending arms 61, each perforated to receive the shank portion of a nipple 57, which latter is provided with an enlarged head portion 62 for engagement against the interior surface of the wall 11 of the tank 10.

The nipples 57 have their shank portion threaded as at 64 whereby nuts 65 may be employed for clamping the arms 61 of the clamping element 56 and the wall 11 of the tank 10 between the heads 62 of the nipples 57 and the nuts 65 and the several parts are thereby secured in fixed relative position. If desired, washers may be interposed between the arms 61 and the nuts 65 as at 66. The clamping element 56 is provided with a marginal flange 67 for abutment against the wall 11 and such flange is extended in the region of the central body portion 60 as at 68, whereby to bear firmly against the outside of the offset marginal portion 20 of the cover element 18 to hold the latter in properly assembled position. A screen 38 is preferably provided and in the illustrated instance is the same in form and in its means of retention as in the first described modification.

What is claimed is:

1. Check valve structure comprising a supporting wall, a depression formed therein and comprising a valve chamber, means interfitting with said depression to provide a cover for said valve chamber, a plurality of fluid nipples in said supporting wall adjacent said valve chamber, and cover retaining means comprising a central portion in engagement with the outside of said cover means and other portions perforated to fit over said fluid nipples, the latter being threaded to receive nuts for applying clamping pressure to said cover means.

2. Check valve structure comprising a supporting wall having an opening therein, an annular offset flange formed in said wall about said opening, a valve seat supported by said flange, a cover element having a marginal flange seating against said valve seat to provide a valve chamber, a disc valve adapted to seat against the valve seat or to be spaced therefrom in said chamber depending on the direction of differential pressure, and means for securing said cover element in assembled relation comprising a plate member having radiating arms and intermediate flange portions projecting toward said cover element to apply clamping pressure thereto, and detachable means for urging said arms toward said supporting walls to clamp said cover element in assembled relation.

3. Check valve structure comprising a pressure chamber wall, a cup-like depression formed therein, a discoidal valve seat in the bottom of said depression and a disc valve for seating upon said valve seat, a discoidal cover element having an annular marginal flange fitting in said cup-like depression and engaging against said valve seat to space the cover element therefrom to form a valve chamber, said depression and said cover element being formed with fluid passages to establish a fluid conduit controllable by said valve, said valve seat and said valve being each formed with an opening, the opening in the valve being offset from the opening in the valve seat whereby movement of the valve from its seat establishes fluid flow through said openings, and cover element clamping means comprising a plate member having radiating arms and intermediate flange portions projecting toward said cover element to apply clamping pressure thereto, and detachable means for urging said arms toward the pressure chamber wall to clamp said cover element in assembled relation.

WILLIS C. HESS.